United States Patent Office 3,494,893
Patented Feb. 10, 1970

3,494,893
PROCESS FOR PREPARING COPOLYMERS OF TRIOXANE
Karl-Heinz Häfner, Bad Orb, and Edgar Fischer, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 10, 1967, Ser. No. 651,970
Claims priority, application Germany, Aug. 17, 1966, F 49,961
Int. Cl. C08g 1/14
U.S. Cl. 260—67        11 Claims

ABSTRACT OF THE DISCLOSURE

Process for copolymerizing trioxane with cyclic ethers and bi-functional compounds containing both ester groups and cyclic ether groups, in the presence of cation-active catalysts at temperatures ranging from —50 to +110° C., whereupon the copolymers are stabilized by an alkaline degradation of the semi-acetal terminal groups.

---

The present invention provides copolymers of trioxane and a process for preparing them.

It is known that, under the action of cation-active catalysts, trioxane and cyclic ethers having at least 2 vicinal carbon atoms in the nucleus, form copolymers which are stable against an alkaline degradation and which are valuable plastic materials owing to their good mechanical and physical properties. Copolymers of this type, however, have the disadvantage that, apart from chemical stabilizing reactions at the end of the polymer chain, they cannot be subsequently modified in the chain itself by chemical reactions. It is, furthermore, known that trioxane can be copolymerized with bi-functional compounds such as cyclohexene-1.2-oxide-4.4-dioxymethylene formal and β-γ-epoxypropoxy-β'-γ'-carbonato-propoxy-alcanes. This process provides polymers which are already cross-linked either under the polymerization conditions or during the subsequent tempering.

We have now found that copolymers can be prepared from 70 to 99.99% by weight of trioxane, 0.01 to 20% by weight of bi-functional compounds and up to 10% by weight of cyclic ethers in the presence of cation-active catalysts at temperatures ranging from —50 to +110° C., by using bi-functional compounds of the formula

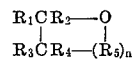

in which $R_1$ may represent a 2.3-epoxy-propyloxy radical or a 1.3-dioxolanyl-4-methoxy radical and $R_2$ may represent an aromatic hydrocarbon radical having 6 or 10 carbon atoms, which radical is substituted by a radical $(A)_x$ and/or $(B)_y$, A representing an alkyl group having 1 to 6 carbon atoms, B representing an alkoxy radical having 1 to 6 carbon atoms, $x$ representing an integer of from 0 to 4, $y$ representing an integer of from 0 to 4 and $x+y$ being less than 5, and $R_3$ represents an alkyl radical having 1 to 6 carbon atoms.

Bi-functional compounds are compounds containing as functional groups both an ester group and a cyclic ether group, especially benzoic acid esters or naphthalene-carboxylic acid esters, preferably methyl ester or ethyl ester having, preferably in o- or p-position, a methoxy group substituted by an epoxy-ethyl radical or 1.3-dioxolan-4-yl-radical. The nucleus of the aromatic carboxylic acid esters mentioned may be once to four times substituted by alkyl- and/or alkoxy radicals having from 1 to 6 carbon atoms, preferably 1 or 2 carbon atoms, the sum of the substituents advantageously being less than 5. Suitable bi-functional compounds are, for example, p-glycidoxybenzoic acid methyl ester, o-glycidoxy-benzoic acid ethyl ester, 3-methoxy-4-glycidoxy-benzoic acid methyl ester, 3-methyl-6-glycidoxy-benzoic acid methyl ester or 2-glycidoxy-naphthalene - 3-carboxylic acid ethyl ester. The amounts of the bi-functional compounds used are in the range of from 0.01 to 20, preferably 1 to 10% by weight, calculated on the whole monomer mixture.

In addition to trioxane and the bi-functional compounds, cyclic ethers may be used in an amount of from 0 to 10, preferably 1 to 5% by weight, calculated on the whole monomer mixture. These cyclic ethers are compounds of the general formula

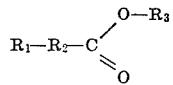

in which $R_1$ to $R_4$ each represents a hydrogen atom or an alkyl radical or a halogen-substituted alkyl radical, $R_5$ represents either a methylene radical or an oxymethylene radical, which may be substituted by an alkyl- or halogenalkyl group, and $n$ represents an integer of from 0 to 3, or $R_5$ represents radical —$(O—CH_2—CH_2)_m—OCH_2$—, $n$ being 1 and $m$ representing an integer of from 1 to 3. The alkyl radicals mentioned contain 1 to 5 carbon atoms and may be substituted by 0 to 3 halogen atoms, preferably chlorine atoms. As cyclic ethers of the above-mentioned formula there are, especially, used olefin oxides, formals of diols and glycidyl ethers of diols, for example ethylene oxide, propylene oxide, epichlorhydrin, 1.4-butane-diol formal, diethylene glycol formal, 1.4-butene-diol formal, 1.4-butane-diol diglycidyl ether, oxacyclobutane and 1.3-dioxolane.

The process of the invention provides copolymers in which the comonomer containing the ester group is incorporated into the macromolecular chain. The monomeric esters practically have no chain-stopping action so that products having a high molecular weight are obtained. Thus, after the copolymers of trioxane, ethylene oxide and p-glycidoxy-benzoic acid methyl ester have been subjected to an alkaline treatment in benzyl alcohol at 150° C. and subsequently boiled several times with methanol, the infrared spectrum thereof shows the carbonyl band which is typical of the ester group. For example, a quantitative evaluation of the infrared spectrum of a copolymer which had been prepared from 100 parts by weight of trioxane, 2 parts by weight of ethylene oxide and 10 parts by weight of p-glycidoxy-benzoic acid methyl ester, had been treated with benzyl alcohol at 150° C. and boiled several times with methanol, established 4.4% by weight of an incorporated p-glycidoxy-benzoic acid methyl ester. After these copolymers containing ester groups have been treated with bases such, for example, as sodium hydroxide, barium hydroxide, calcium hydroxide or sodium methylate, the infrared spectrum no longer shows a carbonyl band of the ester grouping, but the corresponding carboxylate band. Thus, for example, a polymer containing 4.4% by weight of p-glycidoxy-benzoic acid methyl ester incorporated, could be converted into a copolymer containing 3.7% by weight of a sodium salt of p-glycidoxy-benzoic acid incorporated, after a treatment with a solution of benzyl alcohol and sodium methylate at 130° C.

The copolymers obtained can be chemically modified by subsequently treating them with agents reacting with ester groups. For example, the ester groups in the polymer chain can be converted into amide groups by means of ammonia.

The cationic polymerization may be carried out by known methods in bulk, in solution or in suspension. As solvents or suspending agents for the monomers and the catalysts there may be mentioned inert aliphatic or cycloaliphatic hydrocarbons having 5 to 18 carbon atoms, such, for example, as n-hexane or cyclo-hexane. The polymerization is preferably carried out in bulk at temperatures in the range of from 60 to 110° C.

For initiating the copolymerization carried out according to the invention, there are especially suitable Lewis acids (defined by Kortüm, Lehrbuch der Elektrochemie, Wiesbaden 1948, pages 300 and 301), preferably boron trifluoride. Boron trifluoride is preferably used as complex compounds, for example as etherate, oxonium fluoroborate or substituted aryl-diazonium fluoroborate. The concentration of the catalysts depends, above all, on their activity as initiators and may range between 0.0001 and 0.1, preferably 0.001 and 0.1% by weight, calculated on the whole monomer mixture.

For eliminating the instable semi-acetal terminal groups, the copolymers of the invention may be subjected to a known alkaline degradation (described in Belgian Patent No. 617,897). It is advantageous to add to the polymers heat stabilizers, light stabilizers and oxidation stabilizers.

The copolymers prepared according to the invention are thermostable and can be processed thermoplastically. They are important starting materials suitable for modifying polyacetals having reacting groups. They are preferably processed into copolymers having ion groupings.

The following examples serve to illustrate the invention, but they are not intended to limit it thereto.

EXAMPLE 1

20 milliliters of $BF_3$-dibutyl-etherate as a catalyst (diluted to a ratio of 1:40 with cyclohexane) were added to a batch consisting of 1,000 grams of trioxane, 20 grams of ethylene oxide and 30 grams of p-glycidoxy-benzoic acid methyl ester. In a closed vessel the batch was polymerized in a thermally constant bath of 70° C. The polymerization time was 60 minutes. The polymer block obtained was ground and treated for 30 minutes at 150° C. in benzyl alcohol containing 1% by weight of triethanol amine, for eliminating the instable semiacetal terminal groups and the residual monomers. When cool, the polymer was filtered with suction, boiled several times with methanol and dried in vacuo at a temperature in the range of from 50 to 70° C. The yield of polymer was 822 grams.

The following values were measured in the polymer obtained: Reduced specific viscosity $\eta_{red.}=0.33$ (50 milligrams of the polymer were dissolved in 10 milliliters of butyrolactone containing 2% of diphenyl amine, at 140° C. and, at this temperature, the viscosity was measured). The thermostability $K_D$ was 0.0164% per minute. For this purpose, a sample of the polymer was stabilized with 0.7% by weight of 2.2-methylene-bis-4-methyl-6-tert.-butyl-phenol and 0.2% by weight of dicyano-diamide and was then subjected to a thermal degradation at 230° C. for 45 minutes.

EXAMPLE 2

In a manner analogous to Example 1, 1,000 grams of trioxane, 20 grams of ethylene oxide and 50 grams of p-glycidoxy-benzoic acid methyl ester were polymerized with 10 milliliters of $BF_3$-dibutyl-etherate (in a 1:40-dilution). After the alkaline degradation, the yield was 738 grams.

Measured: $K_D=0.0272$, Melt index $i_2=3.7$ grams per 10 minutes (ASTM-D 1238-52T).

EXAMPLE 3

In a manner analogous to Example 1, 100 grams of trioxane, 2 grams of ethylene oxide and 10 grams of p-glycidoxy-benzoic acid methyl ester were polymerized with 3 milliliters of $BF_3$-dibutyl-etherate (in a 1:40-dilution). After the alkaline degradation, the yield was 78 grams. The reduced specific viscosity measured was 0.40.

EXAMPLE 4

In a manner analogous to Example 1, 100 grams of trioxane, 2 grams of ethylene oxide and 1 gram of o-glycidoxy-benzoic acid methyl ester were polymerized with 1 milliliter of $BF_3$-dibutyl-etherate (in a 1:40-dilution). After the alkaline degradation, the yield was 76 grams. The reduced specific viscosity measured was 0.72.

EXAMPLE 5

In a manner analogous to Example 1, 100 grams of trioxane, 2 grams of ethylene oxide and 2 grams of 3-methoxy-4-glycidoxy-benzoic acid methyl ester were polymerized with 2 milliliters of $BF_3$-dibutyl-etherate (in a 1:40-dilution). After the alkaline degradation, the yield was 69 grams. The reduced specific viscosity measured was 0.49.

EXAMPLE 6

In a manner analogous to Example 1, 100 grams of trioxane, 2 grams of ethylene oxide and 2 grams of 3-methyl-6-glycidoxy-benzoic acid methyl ester were polymerized with 2 milliliters of $BF_3$-dibutyl-etherate (in a 1:40-dilution). After the alkaline degradation, the yield was 72 grams. The reduced specific viscosity measured was 0.41.

EXAMPLE 7

In a manner analogous to Example 1, 100 grams of trioxane 2 grams of ethylene oxide and 2 grams of 2-glycidoxy-naphthalene-3-carboxylic acid ethyl ester were polymerized with 2 milliliters of $BF_3$-dibutyl-etherate (in a 1:40-dilution). After the alkaline degradation, the yield was 74 grams. The reduced specific viscosity measured was 0.37.

What is claimed is:

1. A process for preparing copolymers of trioxane, a cyclic ether and a bi-functional compound, wherein a mixture of 70 to 99.9% by weight of trioxane, 0 to 10% by weight of a cyclic ether having the formula:

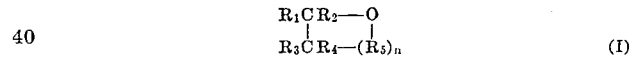

in which $R_1$, $R_2$, $R_3$ and $R_4$ each represents a hydrogen atom or an alkyl or halogen-substituted alkyl radical, and in which $R_5$ either represents a methylene- or oxymethylene-radical, or an alkyl- or halogen-alkyl-substituted methylene- or oxymethylene-radical and $n$ represents an integer of from 0 to 3, or in which Formula I $R_5$ represents the group —$(O—CH_2—CH_2)_m—OCH_2$—, in which $n$ represents 1 and $m$ represents 1, 2 or 3, and 0.01 to 20% by weight of a bi-functional compound having the formula:

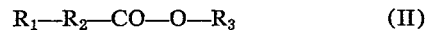

in which $R_1$ represents a 2.3-epoxyproplyoxy radical or a 1.3-dioxolanyl-4-methoxy radical, $R_2$ represents an aromatic hydrocarbon radical having 6 to 10 carbon atoms, which radical is substituted by a radical $(A)_x$ and/or a radical $(B)_y$, radical $(A)_x$ representing an alkyl group having 1 to 6 carbon atoms and radical $(B)_y$ representing an alkoxy group having 1 to 6 carbon atoms, $x$ and $y$ each represents an integer of from 0 to 4 and $x+y$ are less than 5, and $R_3$ represents an alkyl group having 1 to 6 carbon atoms, is polymerized in the presence of a cationic catalyst at a temperature within the range of from −50° to +110° C.

2. A process as claimed in claim 1, wherein the cyclic ether is ethylene oxide, propylene oxide, epichlorhydrine, glycol formal, diglycol formal, 1.4-butanediol formal, 1.4-butanediol diglycidyl ether or oxacyclobutane.

3. A process as claimed in claim 1, wherein the Formula II $R_2$ represents a phenylene radical.

4. A process as claimed in claim 1, wherein the Formula II $R_2$ represents a naphthylene radical.

5. A process as claimed in claim 1, wherein the bifunctional compound is p-glycidoxy benzoic acid methyl ester, o-glycidoxy benzoic acid ethyl ester, 3-methoxy-4- glycidoxy benzoic acid methyl ester, 3-methyl-6-glycidoxy benzoic acid methyl ester or 2-glycidoxy naphthalene-3-carboxylic acid ethyl ester.

6. A process as claimed in claim 1, wherein the polymerization is carried out in solution or in suspension.

7. A process as claimed in claim 1, wherein the polymerization is carried out in the presence of an inert aliphatic or aromatic hydrocarbon.

8. A process as claimed in claim 1, wherein the polymerization catalyst is a Lewis acid.

9. A process as claimed in claim 1, wherein the polymerization catalyst is boron trifluoride or a complex thereof.

10. A process as claimed in claim 1, wherein the catalyst is used in an amount of from 0.0001 to 1.0% by weight, calculated on the whole monomer mixture.

11. A copolymer obtained by a process as claimed in claim 1.

References Cited

UNITED STATES PATENTS

| | | | |
|---|---|---|---|
| 3,026,299 | 3/1962 | Kray et al. | 260—67 |
| 3,275,604 | 9/1966 | Kray et al. | 260—67 |
| 3,293,219 | 12/1966 | Gottesman et al. | 260—67 |

WILLIAM H. SHORT, Primary Examiner

L. M. PHYNES, Assistant Examiner

U.S. Cl. X.R.

260—45.9, 45.95